United States Patent
Farber et al.

(10) Patent No.: US 11,675,932 B2
(45) Date of Patent: Jun. 13, 2023

(54) MANAGING CONTENT AUTHORIZATION IN A FEDERATED APPLICATION SYSTEM

(71) Applicants: Atlassian Pty Ltd., Sydney (AU); Atlassian Inc., San Francisco, CA (US)

(72) Inventors: Jeffrey Lawrence Farber, San Mateo, CA (US); Sidney Gee-Lake Shek, Sunnyvale, CA (US); Pramod Shashidhara, Mountain View, CA (US); Deepak Kulkarni, San Jose, CA (US); Jonathan Paul Gilbert, Kiama (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/670,040

(22) Filed: Feb. 11, 2022

(65) Prior Publication Data

US 2022/0164461 A1 May 26, 2022

Related U.S. Application Data

(63) Continuation of application No. 16/449,150, filed on Jun. 21, 2019, now Pat. No. 11,263,348, which is a
(Continued)

(51) Int. Cl.
*G06F 21/62* (2013.01)
*G06F 21/44* (2013.01)
(Continued)

(52) U.S. Cl.
CPC ............ *G06F 21/629* (2013.01); *G06F 21/44* (2013.01); *G06F 21/604* (2013.01); *G06F 21/64* (2013.01);
(Continued)

(58) Field of Classification Search
CPC ...... G06F 21/629; G06F 21/44; G06F 21/604; G06F 21/64; G06F 2221/2141; H04L 61/0807; H04L 63/0892
See application file for complete search history.

(56) References Cited

U.S. PATENT DOCUMENTS

2005/0010823 A1* 1/2005 Kelley ................. G06F 21/604
726/19
2016/0323290 A1 11/2016 Stead
(Continued)

*Primary Examiner* — Chau Le
(74) *Attorney, Agent, or Firm* — Brownstein Hyatt Farber Schreck, LLP

(57) ABSTRACT

A computer-implemented method includes receiving permission data from an application server. The permission data is for an account to access a software application of a plurality of software applications, and the application server is configured to provide the software application. Responsive to receiving the permission data from the application server, storing the permission data in a native database. Receiving a request to grant the account access to the software application. Determining whether the database stores the permission data for the account to access the software application. In response to determining that the database stores the permission data, granting access to the account to access the software application.

20 Claims, 3 Drawing Sheets

Related U.S. Application Data continuation of application No. 16/287,957, filed on Feb. 27, 2019, now Pat. No. 10,354,093.

(60) Provisional application No. 62/738,972, filed on Sep. 28, 2018.

(51) Int. Cl.
*G06F 21/60* (2013.01)
*G06F 21/64* (2013.01)
*H04L 9/40* (2022.01)

(52) U.S. Cl.
CPC ...... *H04L 63/0807* (2013.01); *H04L 63/0892* (2013.01); *G06F 2221/2141* (2013.01)

(56) References Cited

U.S. PATENT DOCUMENTS

| | | | |
|---|---|---|---|
| 2017/0068954 A1* | 3/2017 | Hockey | H04L 9/3228 |
| 2017/0346830 A1* | 11/2017 | Goldfarb | H04L 67/01 |
| 2018/0211055 A1* | 7/2018 | Balijepalli | H04L 9/3247 |
| 2018/0316656 A1 | 11/2018 | Gigilo | |
| 2019/0018697 A1 | 1/2019 | Larsson | |

* cited by examiner

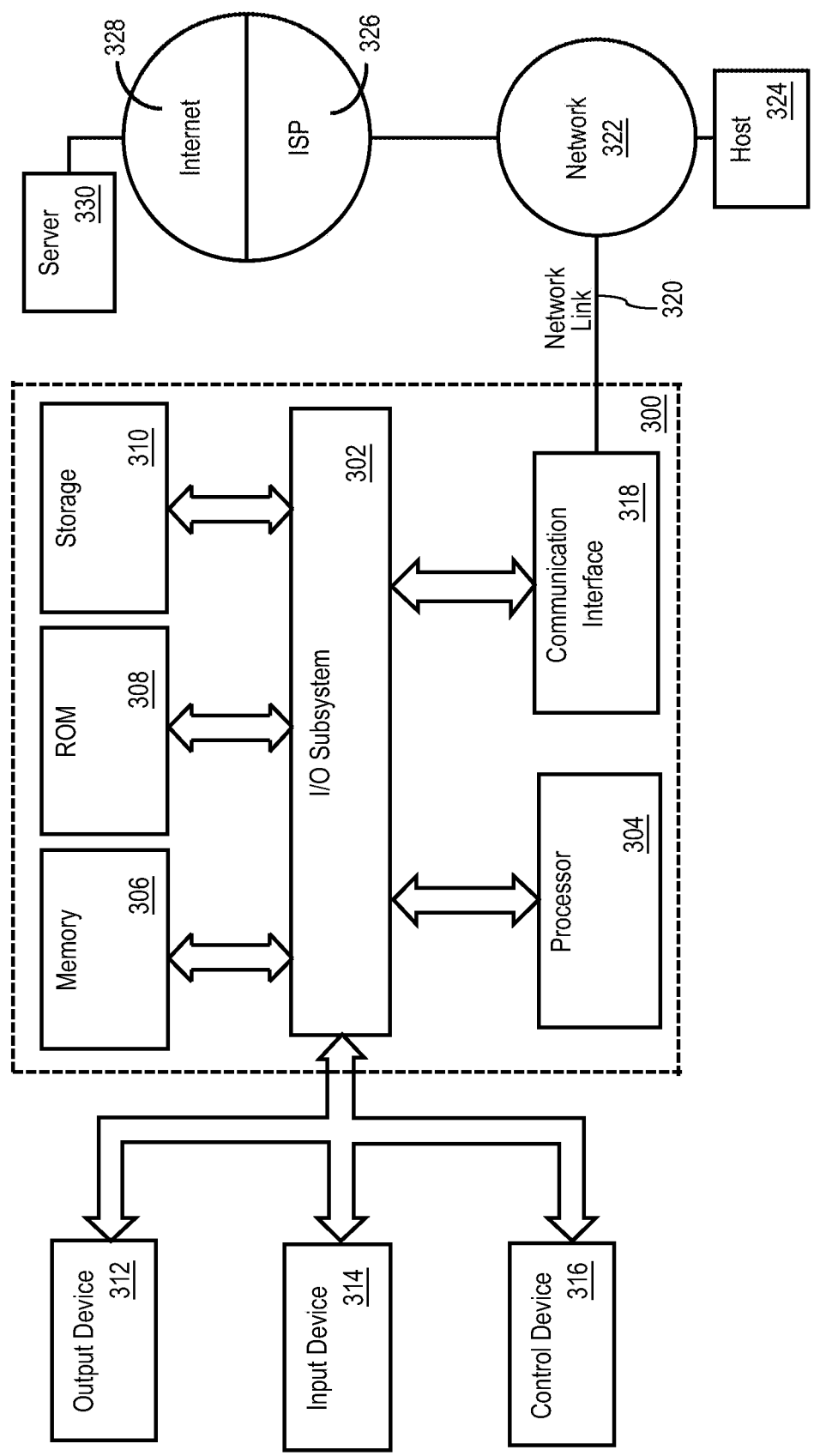

MANAGING CONTENT AUTHORIZATION IN A FEDERATED APPLICATION SYSTEM

CROSS-REFERENCE TO RELATED APPLICATION(S)

This application is a continuation patent application of U.S. patent application Ser. No. 16/449,150, filed Jun. 21, 2019 and titled "Managing Content Authorization in a Federated Application System," which is a continuation of U.S. patent application Ser. No. 16/287,957, filed Feb. 27, 2019 and titled "Managing Content Authorization in a Federated Application System," now U.S. Pat. No. 10,354,093, which is a nonprovisional patent application of and claims the benefit of U.S. Provisional Patent Application No. 62/738,972, filed Sep. 28, 2018 and titled "Managing Content Authorization in a Federated Application System," the disclosures of which are hereby incorporated herein by reference in their entireties.

FIELD

One technical field of the present disclosure is computer-implemented techniques for managing content authorization for software applications in a federated platform system. Another technical field is software-implemented permissions and authorization processing in federated application systems.

BACKGROUND

A computer-based federated platform or system may support several distinct and autonomous software applications, each of which requires the use of different and distributed software elements and corresponding hardware resources to receive user account credentials for purposes of authentication and authorization, and/or to determine what permissions apply to access facilities of the software application. For example, if a particular user account has proper credentials to log into and use a collaborative document application in the federated system, does that user account automatically have the same permissions to use an issue tracking system that is a distinct application but available within the federated system? If the user account has permission to view and comment on a document that is linked to an issue in the issue tracking system, does the user account automatically have the same permissions to view and act on the issue? In such a system of multiple different software applications that cooperate and are presented to user accounts as a unified system, requiring user accounts to use multiple different permissions processing systems, potentially with different account credentials, is inefficient and imposes time delays and excessive network messaging on the system.

A number of deficiencies and problems have been associated with accessing software applications across a federated system, including problems associated with managing content access rights. Through applied effort, ingenuity, and innovation, one or more of these identified problems have been addressed by developing solutions that are included in embodiments of the present disclosure, various examples of which are described in detail herein.

SUMMARY

The appended claims may serve as a summary of the disclosure.

BRIEF DESCRIPTION OF THE DRAWINGS

In the drawings:

FIG. 3 illustrates an example computer system that may be used to implement aspects of the present disclosure.

DETAILED DESCRIPTION

Figure 1:
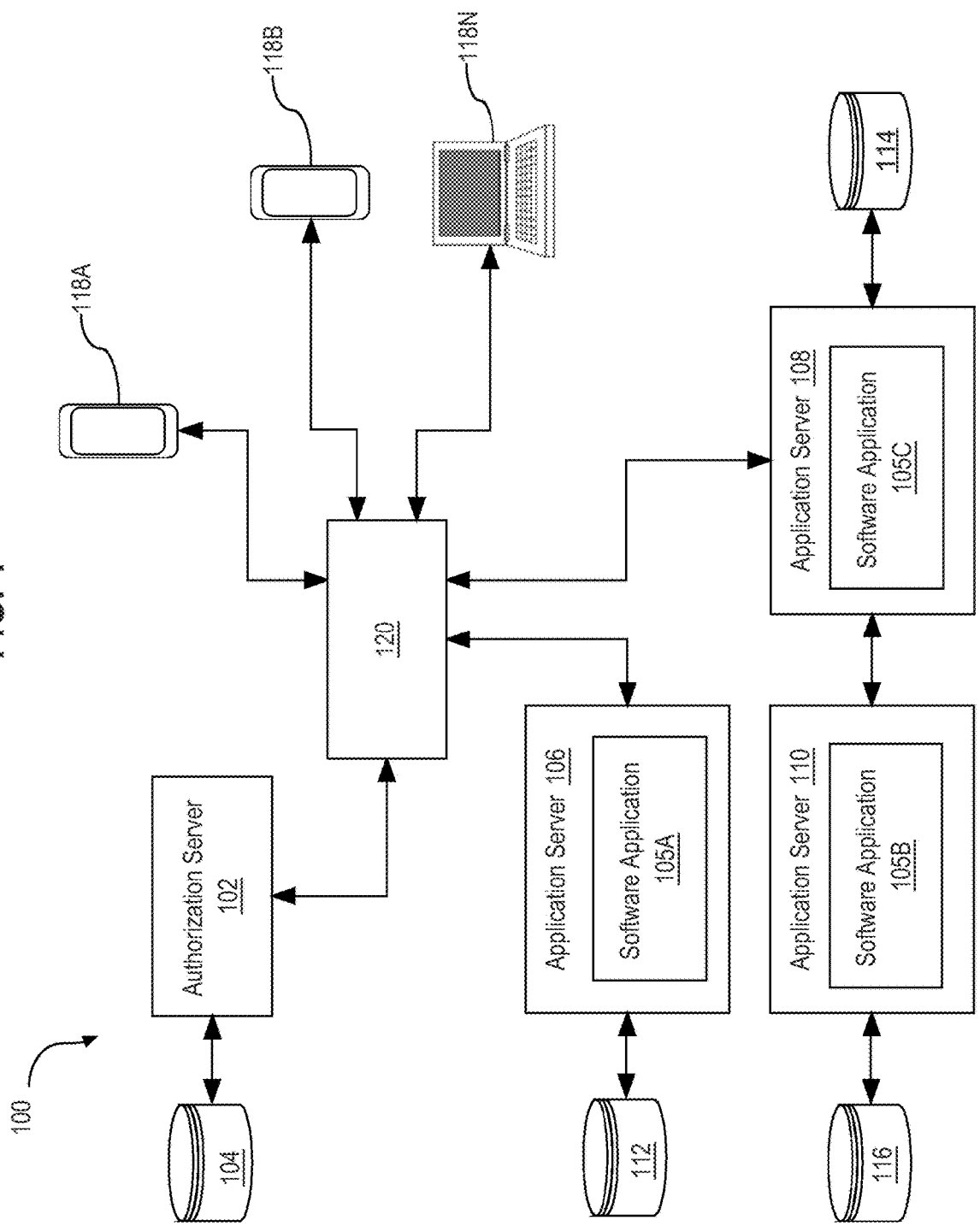
FIG. 1 is a block diagram of a federated application system configured to practice embodiments of the present disclosure.

In the following description, for the purposes of explanation, numerous specific details are set forth to provide a thorough understanding of the present disclosure. It will be apparent, however, that the present disclosure may be practiced without these specific details. In some instances, well-known structures and devices are shown in block diagram form to avoid unnecessary obscuring. Other features, aspects, and advantages of the subject matter will become apparent from the description, the drawings, and the claims.

In an embodiment, techniques are provided for managing content authorization or access permissions for a federated application system, which supports and interfaces with multiple software applications. Each of the software applications may accommodate a plurality of account-based and/or content-based access permissions as well as application-based access permissions. Federated application systems structured in accordance with various embodiments of the disclosure are further configured to support searching. For example, the methods, apparatuses, and computer program products described herein are operable to receive a search query from a user operating a client device and to return search results comprising an account-permitted digital content item set that may be associated with multiple software applications but maintains defined access rights associated with the associated account and/or the digital content items retrieved in the search. The results may then be arranged for display on the client device.

A searchable federated platform may utilize network and content repositories to provide a user with the ability to search for digital content items across the multiple software applications supported by the federated platform. Different users or accounts associated with such users commonly have differing permission or access rights to digital content items associated with the different software applications. Each software application may have unique syntax rules associated with permissions, making polling of permissions data tedious or resource intensive for the federated platform. System resources and time allocated to such searches may be exhausted and compromised as a result of these challenges. The ability to centralize and aggregate permission data or information across the federated platform helps to reduce the computing resources and time necessary to perform platform-wide searches for digital content items, for instance.

In one embodiment, a computer-implemented method includes an authorization server receiving a request to grant an account or user profile access to a software application of a plurality of software applications in a federated application system. In response, the authorization server determines whether a database stores permission or access data for the account to access the software application. In this embodiment, the database is native to the authorization server and under the direct control of the authorization server. Such a native database may be included as a hardware component of the authorization server or otherwise provided for particular use by the authorization server. If the database does not store the permission data, the authorization server sends, via a network to an application server, a request for permission data for the account to access the software application. In this embodiment, the application server is different from the authorization server and is configured to provide the software application, such as by executing computer instructions to implement the software application. In response to sending the request to the application server, the authorization server receives the permission data from the application server, stores the permission data in the database, and grants the account access to the software application in accordance with the received and stored data. In situations where the native database already stores the permission data, the authorization server may grant the account access to the software application.

In another embodiment, the authorization server may receive from the application server a notification that includes updated permission data for the account to access the software application. In one example, the authorization server receives the updated permission data not directly in response to a particular request from a client device. In other words, the application server is configured to independently provide updated permission data, such as when the permission data is modified at the application server and/or just periodically to refresh the permission data. In response to receiving the updated permission data, the authorization server updates permission data in its native database.

Another feature relates to the authorization server using the permission data in its native database to grant the account access to the software application without requiring sending an additional request for permission data to the application server. This aspect helps to centralize the content authorization control at the authorization server of a federated application program system.

Further, the authorization server may aggregate permission data for a user account to access a plurality of different software applications in the form of a single permissions token that includes all such aggregated permission data for the user account. In this embodiment, the authorization server creates, deletes or invalidates, refreshes, edits, or otherwise manages the permissions token as needed or desired. Such a permission token may also be defined to expire after a predetermined time depending on a type of task for which access is requested. For instance, a background task of aggregating content across software applications may be associated with a relatively long-lived token, while a task of accessing software applications on-demand to access particular content may be associated with a token with a relatively short-lived token.

A further feature relates to the authorization server being configured to enforce access controls in addition to permissions managed by the application server. In one such embodiment, a computer-implemented method includes an authorization server receiving a request to grant an account or user profile access to a software application of a plurality of software applications. The authorization server determines whether a database stores first permission data for the account to access the software application. In this embodiment, the database is native to the authorization server, and the first permission data controls content authorization when a user account requests to access the software application through the authorization server. The authorization server sends, via a network to an application server, a request for second permission data for the account to access the software application. In this embodiment, the application server is different from the authorization server and is configured to provide the software application. Further, the application server manages the second permission data to control content authorization when a user account requests to access the software application through the application server. In response to sending the request, the authorization server receives the second permission data from the application server and stores the second permission data in its native database. The authorization server is configured to grant, in accordance with the first permission data and the second permission data, the account access to the software application. In other instances, the first and second permission data are already stored in the database native to the authorization server, and accordingly, the authorization server may grant the account access to the software application without additionally requesting and receiving the second permission data.

Another feature relates to processing multiple access requests to help reduce network traffic. In one embodiment, a computer-implemented method includes an authorization server receiving a request to allow an account or user profile to access a software application of a plurality of software applications. In response, the authorization server determines whether a database stores permission data for the account to access the software application. In this example, the database is native to the authorization server. In response to determining that the database does not store the permission data, the authorization server determines whether its database or a native cache stores valid data regarding a request that has been sent to an application server. In this example, such request is for permission data for the account to access the software application, and the application server is configured to provide the software application. If the database or cache does store valid data regarding the request, then the authorization server refrains from sending another request to the application server. If the database or cache does not store valid data regarding the request, then the authorization server proceeds to send the request via the network to the application server, and to store in its database or cache valid data regarding the request that has been sent to the application server. In response to sending the request to the application server, the authorization server receives the permission data from the application server, invalidates the valid data in the native database or cache regarding the request, and grants the account access to the software application. In response to determining that the database stores the permission data, the authorization server may proceed to grant the account access the software application.

Other embodiments include corresponding systems and computer programs configured to perform the operations of the computer-implemented methods. These and other embodiments can each optionally include one or more additional features disclosed herein or otherwise combine disclosed features is various combinations. Additional features include, for instance, the authorization server and/or the application server utilizing sequence numbers to help organize requests and responses and the server(s) performing additional processing to translate or interpret requests and responses between different software applications and hardware resource.

Example System Architecture

Methods, apparatus, and computer program products of the present disclosure may be embodied by a variety of devices, such as a server or other network entity, configured to communicate with one or more other devices, which may include client devices and other servers or network entities. FIG. 1 is a block diagram of a federated application system in one embodiment. In the federated application system 100 of FIG. 1, an authorization server 102 includes or interoperates with a native database 104. In one embodiment, the native database 104 is controlled or otherwise provided for particular use by the authorization server 102 with minimal computational overhead and additional components. The native database 104 may include a database portion for storing persistent data and a cache portion for storing non-persistent or temporally restricted data. The native database 104 stores account information, including permission data used by the authorization server 102 to control access to one or more software applications 105A, 105B, 105C that are provided by respective one or more application servers 106, 108, 110. The application servers 106, 108, 110 also include or are otherwise operatively coupled to application databases 110, 112, 116, respectively. The application databases 110, 112, 116 may be native to each of the application servers 106, 108, 110, respectively, and also store account information including permission data used by the application servers to control access to the respective software applications.

In this embodiment, the authorization server 102 provides a centralized service for controlling access to the software applications 105A, 105B, 105C, which may be external, autonomous applications that originate from different vendors, enterprises, or sources. A user account may request, via a client device 118A, 118B, 118N, access to the software applications provided by the application servers. More particularly, the authorization server receives access requests from the client devices via a communication network 120 (e.g., the Internet, LAN, WAN, or the like). In response to receiving an access request, the authorization server is configured to access its native database 104 to determine whether valid, complete permission data for the account is stored. The authorization server is also configured to communicate with the application servers 106, 108, 110 via the network 120 to request and receive permission data. In accordance with the permission data, the authorization server communicates with the application servers to grant, deny, or otherwise control access by the account to the software applications.

The application servers may be coupled directly to the network. FIG. 1 also illustrates that the application servers may be coupled indirectly to the network, for instance application server 110 is communicatively coupled to the network 120 through application server 108. Accordingly, the authorization server 102 communicates with the application server 110, for instance, by sending a request through the network 120 and through the application server 108. In this context, the application server 110 is considered to be an edge node of the platform 100, because communications to the application server 110 pass through the intermediate node of application server 108.

The databases 104, 112, 114, 116 store information accessed and used by the servers 102, 106, 108, 110 to facilitate the operations of the federated application system 100. As discussed above, the servers may store account information and permission data, which may more particularly include account profiles and account global permissions profiles. In one embodiment, when the authorization server 102 receives an access request for an account, the authorization server retrieves an account profile so that the global permissions profile can be created or modified. An account profile includes application access permissions and content access permissions specific to the account. An account profile may be created upon registration by an account with the federated platform and/or upon registration by the account with the software applications. Each of the software applications' access permissions and account-specific content access permissions potentially may have differing syntax rules. In some embodiments, the syntax for each access permission is normalized and added to the global permissions profile.

The databases 104, 112, 114, 116 may also store global content permissions profiles comprising content access permissions associated with digital content items that are accessible by the federated platform. The content access permissions may not be account or software application specific. The servers 102, 106, 108, 110 may create a global content permissions profile upon creation of a digital content item, and later retrieve or modify the global content permissions profile. Further, the databases 104, 112, 114, 116 may also store application access permissions specific to software applications that are supported by the federated platform. The application access permissions may not be account or digital content item specific. Application access permissions may be created upon installation of a software application to the federated platform.

The servers 102, 106, 108, 110 may be embodied as a computer or computers as known in the art and may provide for receiving of electronic data from various sources, including but not necessarily limited to the client devices. The databases 104, 112, 114, 116 may be embodied as native data storage devices, including Network Attached Storage (NAS) devices or separate database servers. Electronic data communicated between the authorization server, application servers, and client devices may be provided in various forms and via various methods.

The client devices 118A, 118B, 118N may include computing devices, such as a personal computer or a computer workstation, and/or any of a variety of mobile devices, such as a portable digital assistant (PDA), mobile telephone, smartphone, laptop computer, tablet computer, wearable computing device, or any combination of the aforementioned devices. In embodiments where a client device is a mobile device, such as a smart phone or tablet, the client device may execute an application or "app" to interact with the federated platform. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system. It will be appreciated that a mobile device may also execute a browser to interact with the federated platform (i.e., outside of the context of an "app"). Additionally or alternatively, the client device may interact with the federated platform via a web browser. As yet another example, the client device may include various hardware or firmware designed to interface with the federated platform.

Example Processes for Managing Content Authorization

Figure 2:
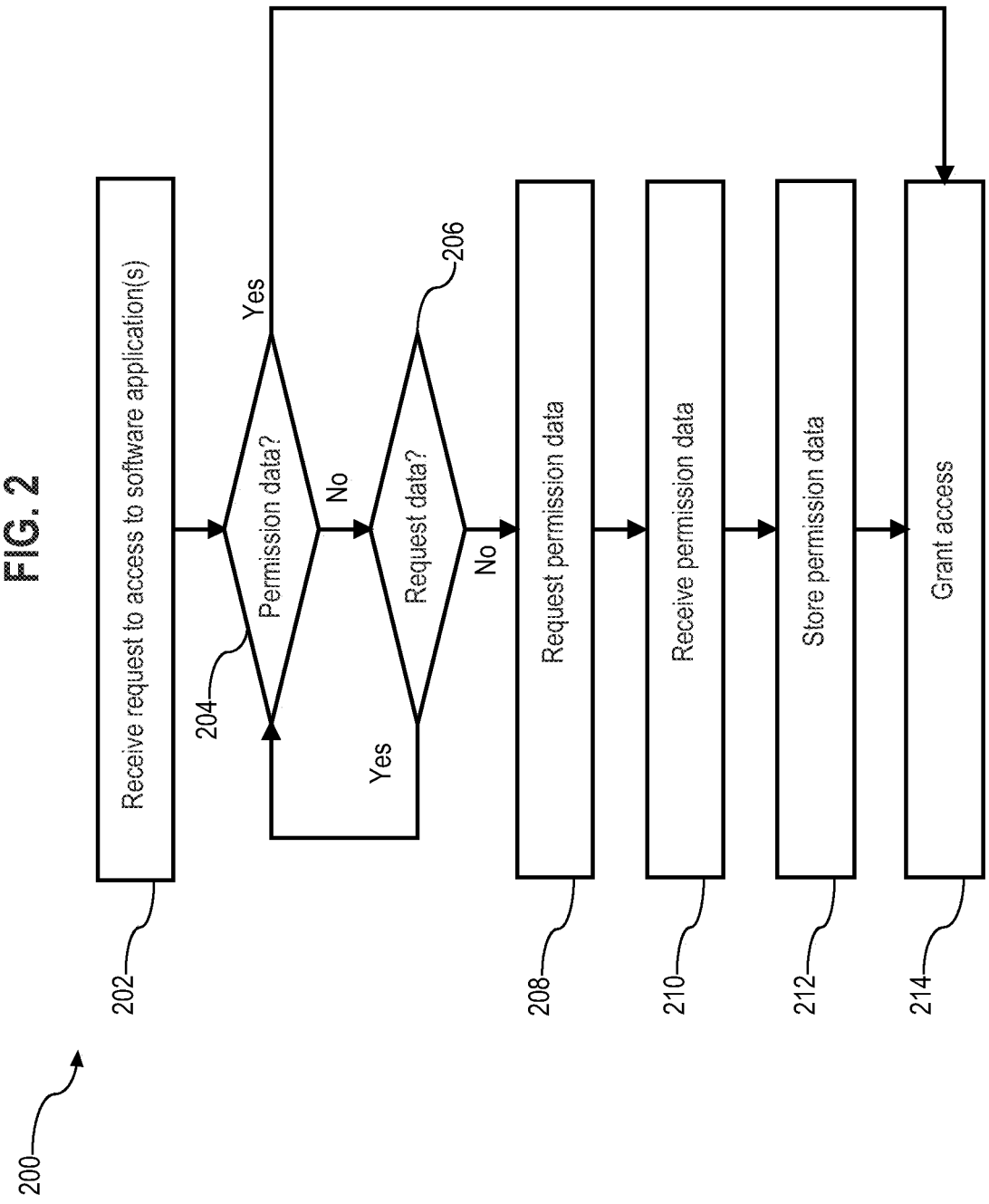
FIG. 2 is a flowchart of functions and processes performed according to an embodiment for managing content authorization for software applications in a federated application system.

FIG. 2 is a flowchart of functions and processes performed according to an embodiment for managing content authorization for software applications in a federated application system. Flowchart 200 of FIG. 2 includes operations, functions, and/or actions as represented by blocks 202-214. For purposes of illustrating a clear example, the flowchart of FIG. 2 is described herein with reference to execution using certain elements of FIG. 1. However, FIG. 2 may be implemented in other embodiments using computing devices, programs, or other computing elements different than those of FIG. 1. Further, although blocks 202-214 are illustrated in a particular order, the blocks may also be performed in parallel, and/or in a different order than described herein. Method 200 may also include additional or fewer blocks, as needed or desired. For example, blocks 202-214 can be combined into fewer blocks, divided into additional blocks, and/or removed based upon a desired implementation.

FIG. 2 may be implemented using one or more computer programs or other software elements organized as sequences of instructions stored on computer-readable storage media. Each flow diagram or other process description in this disclosure, is described at the same level of detail as ordinarily used by persons of skill in the computing arts to communicate among one another about the functional steps to be realized in computer programs that may include far more methods, objects, subroutines, or instructions than specifically indicated in FIG. 2. The development, deployment, testing, and debugging of functional programs is deemed to be within the high level of skill in the art to which this disclosure pertains.

In addition, each block 202-214 may represent a module, a segment, or a portion of program code that includes one or more instructions executable by a processor for implementing specific logical functions or operations. The program code may be stored on any type of computer-readable medium or storage device including a disk or hard drive, for example. The computer-readable medium may include a non-transitory computer-readable medium, such as computer-readable media that stores data for short periods of time like register memory, processor cache, and Random Access Memory (RAM). The computer-readable medium may also include non-transitory media, such as secondary or persistent long-term storage, like read only memory (ROM), optical or magnetic disks, compact-disc read only memory (CD-ROM), etc. The computer-readable medium may also include any other volatile or non-volatile storage systems. The computer-readable medium may be considered a computer-readable storage medium, for example, or a tangible storage device. In addition, one or more of blocks 202-214 may represent circuitry that is configured to perform the logical functions and operations of method 200.

At block 202, the authorization server 102 receives a request for a user account to access a software application of a plurality of software applications provided in a federated platform. The access request includes information to identify the user account, identify the software application, and define the access permissions, such as permission to read, write, and/or delete content through the software application. In one embodiment, the access request also includes or is otherwise associated with a sequence number, which may be a timestamp and/or other tag that the authorization server uses to uniquely identify and track the access request. According to one embodiment, a user associated with a user account requests access to the software application via a client device 118A, 118B, 118N, and the access request is sent from the client device through a network 120 to the authorization server 102.

At block 202, the authorization server 102 may also receive a request for a user account to access more than one software applications of the plurality of software applications. In such situations, the access requests accordingly includes additional information to identify the more than one software applications and define corresponding access permissions. The authorization server may process each request to access a software application according to blocks 204-214, and aggregate permission data for the more than one software applications into a permissions token.

At block 204, the authorization server 102 determines whether the database 104 stores permission data for the user account to access the software application identified by the access request. In this embodiment, the authorization server 102 checks its native database 104 before requesting permission data from an application server 106, 108, 110 that provides the software application. If the database 104 stores permission data for the user account to access the software application, and the stored permission data is valid and complete, then at block 214, the authorization server 102 grants the account access to the software application in accordance with the stored permission data.

In one example, the authorization server 102 determines whether stored permission data is valid and complete by determining that the permission data has not expired or been revoked or overwritten, is associated with the correct user and software application, and/or includes all the necessary permission data for the authorization server to grant the account access to the software application. The authorization server 102 may utilize a sequence number associated with the access request for such purposes of determining whether stored data is valid and complete, for example, by determining that the stored data is associated with the same sequence number as the access request. If the stored data is not associated with the same sequence number, then this could indicate the stored data is outdated or otherwise invalid or incomplete.

If the database 104 does not store permission data for the user account to access the software application, or if stored permission data is not valid and complete, then at block 206, the authorization server 102 determines whether the database 104 stores valid data regarding a request sent to the application server 106, 108, 110 that provides the software application. More particularly, at block 206, the authorization server 102 determines whether a request for permission data for the user account to access the software application has already been sent, and as such the authorization server 102 is awaiting a response to that request. If such a request has already been sent and associated valid data is stored in the database 104, then the authorization server 102 will refrain from sending another repeat request to the application server. Instead, the authorization server will wait for the permission data to be received or otherwise stored in the database 104, or for the data regarding the request to become invalid. In one example, the data regarding the request is considered valid if the request has not timed-out before a response has been received and/or the request is associated with the same sequence number as the access request. By refraining from sending another repeat request when a recent request has already been sent, the authorization server can help to reduce unnecessary network traffic.

In response to the processes of block 206, if the database does not store such valid data, at block 208, the authorization server 102 sends a request for permission data for the user account to access the software application. At block 208, the authorization server 102 sends the request via the network 120 to the application server 106, 108, 110 that provides the software application. Further, the authorization server 102 stores in the database 104 valid data regarding the sent request. The request for permission data and/or the valid data regarding the sent request may include information to identify the account, identify the software application, define the access permissions, and may also include a corresponding sequence number.

At block 210, in response to sending the permission request to the application server 106, 108, 110, the authorization server 102 receives the requested permission data from the application server. At block 212, responsive to receiving the requested permission data from the application server 106, 108, the authorization server 102 stores the received permission data in the database 104.

At block 210 or 212, in response to receiving or storing the permission data, the authorization server invalidates data in the database 104 corresponding to the permission request having been sent to the application server. At block 214, the authorization server 102 grants the account access to the software application in accordance with the stored permission data by communicating such access to the corresponding application server, for example.

In one embodiment, the authorization server is configured to apply another layer of permission data in addition to permission data otherwise managed by an application server for a provided software application. As disclosed herein, the one or more software applications of the federated platform may include distinct and autonomous applications that manage content authorizations in accordance with its own permission data. The authorization server disclosed herein is configured as a centralized entity that manages access permissions and content authorizations for a plurality of such software applications. The authorization server is configured to grant access to each of the plurality of software applications in accordance with the permission data received from but otherwise controlled the application servers. In the present embodiment, the authorization server 102 is configured to add another layer of permission data, of which the application server may not be aware. The authorization server may store this additional layer of permission data in the native database 104.

In one example, an application server 106, 108, 110 provides permission data to the authorization server 102, and the application permission data grants access to a given user account to access a provided software application. The authorization server 102 stores this application permission data in the native database 104. In this example, the authorization server 102 also stores authorization permission data in the native database 104 that only grants access to one or more of the software applications if a given user account uses two-factor-authentication, for instance. At block 214, the authorization server 102 is configured to grant an account access to the software application in accordance with the stored permission data, which includes the application permission data and the authorization permission data.

Referring again to block 210, the present disclosure also contemplates that the authorization server 102 may receive permission data separately from a particular, on-demand request sent to the application servers 106, 108, 110. In such an embodiment, the application server is configured to independently provide updated permission data, such as when the permission data is modified at the application server and/or just periodically to refresh the permission data. One or more of the application servers 106, 108, 110 may not even store native permission data, but may instead push, or automatically send permission data to the authorization server 102 for storage and management. In response to receiving the updated permission data, at block 210, the authorization server 102 stores the updated permission data in its native database 104. In one example, the updated permission data includes a sequence number, and the authorization server use the sequence number to determine whether the updated permission data is the most recent data or otherwise should be used to overwrite stored permission data for a given user account and software application. For instance, if the sequence number of the updated permission data precedes the sequence number of permission data already stored in the database, then the authorization server may not update the stored permission data.

In one embodiment, at block 212, the authorization server 102 aggregates permission data for a user account in the form of a single permissions token that includes permission data for the user account to access a plurality of different software applications. The permissions token may also incorporate the additional layer of permission data managed solely by the authorization server 102, as discussed above. In the present embodiment, the authorization server creates, deletes or invalidates, refreshes, edits, or otherwise manages the permissions token as needed or desired. At block 214, the authorization server 102 may then use the permissions token to grant the user account access across a plurality of software applications. Such a permissions token may also be defined to expire after a predetermined time depending on a type of task for which access is requested. For instance, a background task of aggregating content across software applications may be associated with a relatively long-lived token, while a task of accessing software applications on-demand to access particular content may be associated with a token with a relatively short-lived token.

The federated application system 100 may further use permissions tokens to aggregate permission data as the data is communicated through the system. In one embodiment, at block 208, the authorization server 102 sends a request for permission data for a user account to access a software application not directly to the application server that provides the software application, but to an application server that is an edge node of the application server that provides the software application. For example, the authorization server 102 may receive a request for a user account to access a software application provided by the application server 108, and in response to receiving the request, the authorization server sends a request for permission data to the edge node application server 110. The application server 110 provides its permission data for the user account, for instance by incorporating the permission data into a permissions token, and passes the permission token through the intermediate node application server 108. The application server 108 provides its permission data for the user account, for instance by incorporating the permission data into the permissions token, and passes the permission token to the authorization server 102 via the network 120. The authorization server 102 can then store the permissions token which has permission data for the software applications provided by the application servers 108, 110. In this manner, the authorization server 102 can accumulate additional permission data for more of the software applications without sending separate requests to each application server.

This technique can also be applied when any permission data is sent from an edge node through intermediate nodes of the system. For instance, the application server 110 may independently provide updated permission data separately from a particular, on-demand request sent by the authorization server. As the updated permission data from the application server 110 passes through the application server 108, the application server 108 may add its own permission data and communicate aggregated permission data back to the authorization server 102 for storage and use in content authorization.

Implementation Mechanisms—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

FIG. 3 is a block diagram that illustrates an example computer system with which an embodiment may be implemented. In the example of FIG. 3, a computer system 300 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 300 includes an input/output (I/O) subsystem 302 which may include a bus and/or other communication mechanism(s) for communicating information and/or instructions between the components of the computer system 300 over electronic signal paths. The I/O subsystem 302 may include an I/O controller, a memory controller and at least one I/O port. The electronic signal paths are represented schematically in the drawings, for example as lines, unidirectional arrows, or bidirectional arrows.

At least one hardware processor 304 is coupled to I/O subsystem 302 for processing information and instructions. Hardware processor 304 may include, for example, a general-purpose microprocessor or microcontroller and/or a special-purpose microprocessor such as an embedded system or a graphics processing unit (GPU) or a digital signal processor or ARM processor. Processor 304 may comprise an integrated arithmetic logic unit (ALU) or may be coupled to a separate ALU.

Computer system 300 includes one or more units of memory 306, such as a main memory, which is coupled to I/O subsystem 302 for electronically digitally storing data and instructions to be executed by processor 304. Memory 306 may include volatile memory such as various forms of random-access memory (RAM) or other dynamic storage device. Memory 306 also may be used for storing temporary variables or other intermediate information during execution of instructions to be executed by processor 304. Such instructions, when stored in non-transitory computer-readable storage media accessible to processor 304, can render computer system 300 into a special-purpose machine that is customized to perform the operations specified in the instructions.

Computer system 300 further includes non-volatile memory such as read only memory (ROM) 308 or other static storage device coupled to I/O subsystem 302 for storing information and instructions for processor 304. The ROM 308 may include various forms of programmable ROM (PROM) such as erasable PROM (EPROM) or electrically erasable PROM (EEPROM). A unit of persistent storage 310 may include various forms of non-volatile RAM (NVRAM), such as FLASH memory, or solid-state storage, magnetic disk, or optical disk such as CD-ROM or DVD-ROM and may be coupled to I/O subsystem 302 for storing information and instructions. Storage 310 is an example of a non-transitory computer-readable medium that may be used to store instructions and data which when executed by the processor 304 cause performing computer-implemented methods to execute the techniques herein.

The instructions in memory 306, ROM 308 or storage 310 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 300 may be coupled via I/O subsystem 302 to at least one output device 312. In one embodiment, output device 312 is a digital computer display. Examples of a display that may be used in various embodiments include a touch screen display or a light-emitting diode (LED) display or a liquid crystal display (LCD) or an e-paper display. Computer system 300 may include other type(s) of output devices 312, alternatively or in addition to a display device. Examples of other output devices 312 include printers, ticket printers, plotters, projectors, sound cards or video cards, speakers, buzzers or piezoelectric devices or other audible devices, lamps or LED or LCD indicators, haptic devices, actuators, or servos.

At least one input device 314 is coupled to I/O subsystem 302 for communicating signals, data, command selections or gestures to processor 304. Examples of input devices 314 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 316, which may perform cursor control or other automated control functions such as navigation in a graphical interface on a display screen, alternatively or in addition to input functions. Control device 316 may be a touchpad, a mouse, a trackball, or cursor direction keys for communicating direction information and command selections to processor 304 and for controlling cursor movement on display 312. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 314 may include a combination of multiple different input devices, such as a video camera and a depth sensor.

In another embodiment, computer system 300 may comprise an internet of things (IoT) device in which one or more of the output device 312, input device 314, and control device 316 are omitted. Or, in such an embodiment, the input device 314 may comprise one or more cameras, motion detectors, thermometers, microphones, seismic detectors, other sensors or detectors, measurement devices or encoders and the output device 312 may comprise a special-purpose display such as a single-line LED or LCD display, one or more indicators, a display panel, a meter, a valve, a solenoid, an actuator or a servo.

When computer system 300 is a mobile computing device, input device 314 may comprise a global positioning system (GPS) receiver coupled to a GPS module that is capable of triangulating to a plurality of GPS satellites, determining and generating geo-location or position data such as latitude-longitude values for a geophysical location of the computer system 300. Output device 312 may include hardware, software, firmware, and interfaces for generating position reporting packets, notifications, pulse or heartbeat signals, or other recurring data transmissions that specify a position of the computer system 300, alone or in combination with other application-specific data, directed toward host 324 or server 330.

Computer system 300 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 300 in response to processor 304 executing at least one sequence of at least one instruction contained in main memory 306. Such instructions may be read into main memory 306 from another storage medium, such as storage 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 310. Volatile media includes dynamic memory, such as memory 306. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 302. Transmission media can also take the form of acoustic or light waves, such as those generated during radio-wave and infra-red data communications.

Various forms of media may be involved in carrying at least one sequence of at least one instruction to processor 304 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 300 can receive the data on the communication link and convert the data to a format that can be read by computer system 300. For instance, a receiver such as a radio frequency antenna or an infrared detector can receive the data carried in a wireless or optical signal and appropriate circuitry can provide the data to I/O subsystem 302 such as place the data on a bus. I/O subsystem 302 carries the data to memory 306, from which processor 304 retrieves and executes the instructions. The instructions received by memory 306 may optionally be stored on storage 310 either before or after execution by processor 304.

Computer system 300 also includes a communication interface 318 coupled to bus 302. Communication interface 318 provides a two-way data communication coupling to network link(s) 320 that are directly or indirectly connected to at least one communication networks, such as a network 322 or a public or private cloud on the Internet. For example, communication interface 318 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 322 broadly represents a local area network (LAN), wide-area network (WAN), campus network, internetwork, or any combination thereof. Communication interface 318 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 318 sends and receives electrical, electromagnetic, or optical signals over signal paths that carry digital data streams representing various types of information.

Network link 320 typically provides electrical, electromagnetic, or optical data communication directly or through at least one network to other data devices, using, for example, satellite, cellular, Wi-Fi, or BLUETOOTH technology. For example, network link 320 may provide a connection through a network 322 to a host computer 324.

Furthermore, network link 320 may provide a connection through network 322 or to other computing devices via internetworking devices and/or computers that are operated by an Internet Service Provider (ISP) 326. ISP 326 provides data communication services through a world-wide packet data communication network represented as internet 328. A server computer 330 may be coupled to internet 328. Server 330 broadly represents any computer, data center, virtual machine, or virtual computing instance with or without a hypervisor, or computer executing a containerized program system such as DOCKER or KUBERNETES. Server 330 may represent an electronic digital service that is implemented using more than one computer or instance and that is accessed and used by transmitting web services requests, uniform resource locator (URL) strings with parameters in HTTP payloads, API calls, app services calls, or other service calls. Computer system 300 and server 330 may form elements of a distributed computing system that includes other computers, a processing cluster, server farm or other organization of computers that cooperate to perform tasks or execute applications or services. Server 330 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 330 may comprise a web application server that hosts a presentation layer, application layer and data storage layer such as a relational database system using structured query language (SQL) or no SQL, an object store, a graph database, a flat file system or other data storage.

Computer system 300 can send messages and receive data and instructions, including program code, through the network(s), network link 320 and communication interface 318. In the Internet example, a server 330 might transmit a requested code for an application program through Internet 328, ISP 326, local network 322 and communication interface 318. The processor 304 may execute the received code as it is received, and/or store the code in storage 310 or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 304. While each processor 304 or core of the processor executes a single task at a time, computer system 300 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

Definitions

As used herein, the terms "data," "content," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Likewise, where a computing device is described to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "federated platform" or "federated application system" refers to a computing service that is accessible via one or more computing devices and that is operable to provide access to a plurality of software applications related to business operations of one or more enterprises or companies. In some examples, the federated platform may take the form of a central server disposed in communication with one or more additional application servers that run software applications, and having access to one or more application databases that store digital content items, application related data, permission data, and/or the like.

The term "software application" refers to a computer program designed to perform a group of coordinated functions, tasks, or activities for the benefit of a user or group of users. Examples of a software application may include an enterprise knowledge management and collaboration software (e.g., Confluence® by Atlassian, Trello® by Atlassian), an enterprise software project planning and tracking application (e.g., Jira® by Atlassian), a word processor, a spreadsheet, an accounting application, a web browser, a media player, a computer coding project collaboration engine (e.g., StatusPage® by Atlassian, Bitbucket® by Atlassian, SourceTree® by Atlassian, Bamboo® by Atlassian, Clover® by Atlassian, FishEye® by Atlassian, Crucible® by Atlassian), a scheduling engine, or an electronic networked messaging application (e.g., HipChat® by Atlassian, Stride® by Atlassian). A software application may also refer to a collection of software applications. Software applications may be bundled for a computer and its system software or published separately, and may be coded as proprietary, or open source. Software applications may also be built for mobile platforms.

The term "native," such as in the context of a native database, refers to a computing resource, program, or other component that is developed for use on or by a particular platform, device, or software application. A system generally supports such a native component with minimal computation overhead and additional components.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

The term "user profile" or "account profile" refers to a collection of preferences, settings, configurations, client device identifiers, data, and information associated with a specific user or account. A profile refers therefore to the explicit digital representation of a user's identity and other data or information associated with the user. An account profile configured in accordance with the present disclosure is accessible by one or more of the software applications that are supported by the federated platform and, thus, may include application-specific preferences, settings, configurations, data, and information. In some embodiments, an account profile can be used to store a description of characteristics of the user and/or of the client device, as well as credentials and preferences of the user.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method for managing account access to multiple software applications using an authorization server, the method comprising:
   receiving, at the authorization server, a first request to grant access for a first account to a first software application of the multiple software applications;
   receiving, at the authorization server, a second request to grant access for a second account to a second software application of the multiple software applications;
   determining, at the authorization server, whether a data store managed by the authorization server contains first permission data for the first account associated with the first request;
   determining, at the authorization server, whether the data store managed by the authorization server contains second permission data for the second account associated with the second request;
   in response to determining that the data store does not store the first permission data, sending, to a first application server associated with the first software application, a third request for third permission data for the first account;
   responsive to the third request, receiving, from the first application server, the third permission data;
   responsive to receiving the third permission data from the first application server, storing the third permission data in the data store managed by the authorization server; and
   granting, in accordance with the third permission data, access to the first software application for the first account.

2. The computer-implemented method of claim 1, further comprising:
   in response to determining that the data store does not store the second permission data, sending, to a second application server associated with the second software application, a fourth request for fourth permission data for the second account;
   responsive to the fourth request, receiving, from the second application server, the fourth permission data;
   responsive to receiving the fourth permission data from the second application server, storing the fourth permission data in the data store managed by the authorization server; and
   granting, in accordance with the fourth permission data, access to the second software application for the second account.

3. The computer-implemented method of claim 1, wherein:
   the method further comprises incorporating, by the authorization server, at least one of the first permission data or the second permission data into a permissions token that aggregates permission data; and
   granting access to the first account to access the first software application using the permissions token.

4. The computer-implemented method of claim 1, further comprising:
   receiving, by the authorization server from the first application server, a notification that includes updated permission data for the first account to access the first software application; and
   updating, by the authorization server and in accordance with the notification, at least one of the first permission data or the second permission data stored in the data store.

5. The computer-implemented method of claim 1, wherein:
   granting, in accordance with the second permission data stored in the data store, access to the first software application is performed without requiring sending an additional request for permission data to the first application server.

6. The computer-implemented method of claim 1, wherein:
   granting, in accordance with the first permission data stored in the data store, access to the first software application is performed without requiring sending an additional request for permission data to the application server.

7. The computer-implemented method of claim 1, wherein the first request and the second request are generated in response to a search query initiated at a client device.

8. The computer-implemented method of claim 1, further comprising:
receiving, at the authorization server from the first application server, a notification that includes updated permission data for the first account to access the first software application; and
updating, by the authorization server and in accordance with the notification, at least one of the first permission data or the second permission data stored in the data store.

9. A computer-implemented method comprising:
receiving, at an authorization server, a first request for access to a first software application of a set of software applications;
receiving, at the authorization server, a second request for access to a second software application of the set of software applications;
determining, at the authorization server, whether a data store managed by the authorization server contains first permission data associated with the first software application;
determining, at the authorization server, whether the data store managed by the authorization server contains second permission data associated with the second software application;
in response to determining that the data store contains the second permission data, authenticating the second request using the second permission data and granting access to the second software application for a second account associated with the second request;
in response to determining that the data store does not store the first permission data, sending, to a first application server associated with the first software application, a permissions request;
responsive to the permissions request, receiving, from the first application server, application-provided permission data; and
responsive to receiving the application-provided permission data from the first application server, granting, in accordance with the application-provided permission data, access to the first software application for a first account associated with the first request.

10. The computer-implemented method of claim 9, further comprising:
receiving, by the authorization server from the first application server, an update that includes updated permission data for the first account to access the first software application; and
updating, by the authorization server and in accordance with the update, at least one of the first permission data or the second permission data stored in the data store.

11. The computer-implemented method of claim 9, further comprising:
incorporating, by the authorization server, at least one of the first permission data or the second permission data into a permissions token that aggregates permission data for the set of software applications; and
granting access to the first software application using the permissions token.

12. The computer-implemented method of claim 9, further comprising:

granting, in accordance with the second permission data stored in the data store, access to the second software application without requiring sending an additional request for permission data to a second application server.

13. The computer-implemented method of claim 9, wherein:
the first request includes a first sequence number and the first permission data includes a second sequence number that corresponds with the first sequence number.

14. The computer-implemented method of claim 9, wherein:
the first request includes a first sequence number;
the first permission data includes a second sequence number;
the application-provided permission data includes a third sequence number;
the permissions request includes a fourth sequence number; and
the first sequence number, the second sequence number, the third sequence number, and the fourth sequence number correspond with each other.

15. An authorization server comprising:
a processor;
a computer-readable non-transitory storage media storing instructions programmed to manage access permissions for a plurality of software applications, the instructions, when executed by the processor cause the authorization server to:
in response to receiving a first request for access to a first software application of a set of software applications and receiving a second request for access to a second software application of the set of software applications:
determine whether a data store, managed by the authorization server, contains first permission data associated with the first software application; and
determine whether the data store, managed by the authorization server, contains second permission data associated with the second software application;
in response to determining that the data store contains the second permission data, grant access to the second software application for a second account associated with the second request;
in response to determining that the data store does not store the first permission data, send, to a first application server associated with the first software application, a permissions request;
responsive to the permissions request, receive, from the first application server, application-provided permission data; and
responsive to receiving the application-provided permission data from the first application server, grant, in accordance with the application-provided permission data, access to the first software application for a first account associated with the first request.

16. The authorization server of claim 15, wherein the instructions are further configured to:
grant, in accordance with the second permission data stored in the data store, access to the second software application without requiring sending an additional request for permission data to a second application server.

17. The authorization server of claim 15, wherein:
the authorization server is operably coupled to a client device via a communication network; and the client device is configured to initiate the first and second requests in response to a search query performed at the client device.

18. The authorization server of claim 15, wherein:
the first application server is configured to provide the first software application;
the first software application is an enterprise knowledge management and collaboration software platform;
a second application server is configured to provide the second software application; and
the second software application is an enterprise software project planning and tracking application.

19. The authorization server of claim 15, wherein:
the first application server comprises an application database; and
the application-provided permission data is stored in the application database.

20. The authorization server of claim 15, wherein the data store comprises:
a database portion including a native database that is native to the authorization server; and
a cache portion including a native cache that is managed by the authorization server.

* * * * *